(12) United States Patent
Gurt

(10) Patent No.: US 11,036,950 B2
(45) Date of Patent: Jun. 15, 2021

(54) DEVICE AND METHOD FOR PRODUCING AND DETECTING A FORGERY-PROOF IDENTIFICATION

(71) Applicant: FIBRO GMBH, Hassmersheim (DE)

(72) Inventor: Juergen Gurt, Hassmersheim (DE)

(73) Assignee: FIBRO GMBH, Hassmersheim (DE)

( * ) Notice: Subject to any disclaimer, the term of this patent is extended or adjusted under 35 U.S.C. 154(b) by 0 days.

(21) Appl. No.: 16/318,955

(22) PCT Filed: May 11, 2017

(86) PCT No.: PCT/EP2017/061360
§ 371 (c)(1),
(2) Date: Jan. 18, 2019

(87) PCT Pub. No.: WO2018/015037
PCT Pub. Date: Jan. 25, 2018

(65) Prior Publication Data
US 2019/0286866 A1   Sep. 19, 2019

(30) Foreign Application Priority Data

Jul. 21, 2016 (DE) .......................... 102016113513.5

(51) Int. Cl.
*G06K 7/10* (2006.01)
*G06K 7/14* (2006.01)
*G06K 19/06* (2006.01)

(52) U.S. Cl.
CPC ..... *G06K 7/1417* (2013.01); *G06K 19/06037* (2013.01); *G06K 19/06103* (2013.01); *G06K 19/06121* (2013.01)

(58) Field of Classification Search
CPC .......... G06K 7/1417; G06K 19/06037; G06K 19/06103; G06K 19/06121
USPC ....................................... 235/462.1
See application file for complete search history.

(56) References Cited

U.S. PATENT DOCUMENTS

| 4,936,608 | A | 6/1990 | Gensel et al. |
| 5,267,756 | A | 12/1993 | Molee et al. |
| 6,268,899 | B1* | 7/2001 | Edwards ................ G03B 35/24 347/129 |
| 6,400,989 | B1* | 6/2002 | Eckmiller .......... A61N 1/36038 607/54 |
| 2006/0091214 | A1 | 5/2006 | Hyde et al. |
| 2006/0148210 | A1 | 7/2006 | Furuta et al. |
| 2006/0152791 | A1 | 7/2006 | Wolleschensky et al. |

(Continued)

FOREIGN PATENT DOCUMENTS

| DE | 3728622 C1 | 5/1988 |
| DE | 10231969 A1 | 2/2004 |

(Continued)

OTHER PUBLICATIONS

International Search Report dated Aug. 22, 2017 issued in PCT/EP2017/061360.
English Abstract of WO 2014/044343 A2 dated Mar. 27, 2014.

*Primary Examiner* — Thien M Le
(74) *Attorney, Agent, or Firm* — Scully Scott Murphy and Presser

(57) ABSTRACT

The invention relates to a method and a device (100) for forming a two-dimensional or three-dimensional microstructured identification structure (200) in a defined surface region (12) in a surface (11) of a component (10) or product.

15 Claims, 2 Drawing Sheets

(56) References Cited

U.S. PATENT DOCUMENTS

| | | | | |
|---|---|---|---|---|
| 2006/0209412 | A1* | 9/2006 | Schilling | B42D 25/342 |
| | | | | 359/569 |
| 2007/0180248 | A1* | 8/2007 | Gorostidi | G07F 7/122 |
| | | | | 713/173 |
| 2009/0115614 | A1* | 5/2009 | Bertin | H04L 9/3247 |
| | | | | 340/572.8 |
| 2009/0324104 | A1* | 12/2009 | Cheung | H04N 1/32261 |
| | | | | 382/224 |
| 2012/0067955 | A1* | 3/2012 | Rowe | G06K 7/1417 |
| | | | | 235/454 |
| 2013/0153657 | A1* | 6/2013 | Loughrey | G06K 19/06037 |
| | | | | 235/437 |
| 2014/0263674 | A1* | 9/2014 | Cerveny | G06K 19/06037 |
| | | | | 235/494 |
| 2016/0253584 | A1* | 9/2016 | Fodor | C12Q 1/6813 |
| | | | | 235/494 |
| 2016/0371303 | A1* | 12/2016 | Voigt | G06K 9/18 |
| 2017/0091611 | A1* | 3/2017 | Soborski | G06F 21/44 |
| 2017/0308779 | A1* | 10/2017 | Thuries | G06K 7/10712 |
| 2018/0039807 | A1* | 2/2018 | O'Brien | G06F 16/9538 |

FOREIGN PATENT DOCUMENTS

| | | | |
|---|---|---|---|
| DE | 10259443 | A1 | 7/2004 |
| DE | 102006000720 | A1 | 9/2006 |
| DE | 2012018388 | A1 | 3/2014 |
| EP | 2792499 | A1 | 10/2014 |

* cited by examiner

DEVICE AND METHOD FOR PRODUCING AND DETECTING A FORGERY-PROOF IDENTIFICATION

The invention relates to a method for forming a recognition feature and/or a forgery-proof identification on a partial surface of a component or product, and also a product or component having such a recognition feature. The invention furthermore relates to a device for detecting and/or reading such an identification.

Many copies and forgeries of industrial products appear professional and differences are recognizable hardly or not at all even if one holds an original product next to it for comparison. Counterfeit products increasingly appear like the originals at first glance and the original producers of the products are held liable for foreign replicas in the context of the guarantee. The affected producers then have problems in proving on the basis of product features that it is a replica.

Diverse solutions have thus already been developed in the market in order to unambiguously identify products, for example, consumer protection portals on the theme of trademark and product forgeries. In addition, as a consumer you can inform yourself about how an original product differs from a forgery or a replica.

In the measures known from the prior art for forgery protection of an object to be protected, the object is typically provided with features, (for example, watermarks, holograms, chemical or physical changes, etc.), which may be copied only with great technical knowledge and/or a high level of expenditure.

Such a forgery safeguard for objects is proposed in the document U.S. Pat. No. 5,267,756, wherein a hologram having a one-time code number is fastened on the object. A buyer or possessor of the object can verify its authenticity at any time via query on a hotline. The verification is performed via a list (in particular database), which contains the assigned code number.

Such methods for forgery protection have the disadvantage that in addition to the object, the forgery safeguard, i.e., in this case the hologram having the one-time code number, cannot be precluded from also being copied.

An apparatus for recognizing a code on an article or its package is known from DE 102012018388 B4, wherein the data of the code are input by machine using at least one optical read device and are further processed, decoded, and stored in an electronic data processing unit, characterized in that the optical read device has at least one camera oriented onto an article positioned on an underlying surface or its package, with which camera at least three illumination bodies are associated, wherein the illumination bodies are arranged in space in relation to one another and with respect to the article or the package in such a way that, in the case of an embossed code to be recognized, a different shading is generated in the region of the embossed code and the embossed code is recognized in the data processing unit connected to the camera as a result of the shading.

Such solutions have the disadvantage of the fact that they cannot be attached to the surface of many products for technical obstruction reasons. In particular in the case of products having a technical surface which is to have certain specific properties, for example, as a sealing surface or contact surface on another component, such components cannot be attached.

Laser structuring methods for structuring on surfaces of components using a laser beam are also known from the prior art. The formation of structure elements is performed in this case, for example, by means of laser interference structuring. In known methods, for example, a laser beam is oriented onto an optical diffractive element, using which the laser beam can be split into multiple partial beams. The partial beams are then oriented onto a surface to be structured using two optically focusing lenses, which are arranged at a distance to one another. In this case, the partial beams are additionally changed in the beam direction thereof using one of the two lenses in such a way that they are incident on the same surface region of a component. Since the optical lenses have a constant focal length, a replacement with at least one other lens having a focal length different therefrom is necessary if the interference period is to be changed.

In another known possibility, a laser beam is split into partial beams by means of at least one beam splitter device and the partial beams thus obtained are oriented with the aid of reflective elements from different spatial directions onto the surface to be structured to generate a specific structure. In this case, the partial beams are each to pass through the same path length until they are incident on the surface. A substantial space requirement is necessary for this purpose. Furthermore, a complex precise adjustment of reflective optical elements is necessary for an adaptation of the interference periods.

A processing method for the optical examination and processing of a sample is known from DE 102 59 443 A1.

A laser processing machine for forming grooves is known from DE 10 2006 000 720 A1, which is also not suitable for identifying technically functional surfaces of components. Thus, for example, the introduction of grooves into a sealing surface of a piston rod would destroy the sealing property of said surface.

Further disadvantages of the solutions known from the prior art which are structures on surfaces generated using conventional laser methods:
   the lack of forgery protection, since the laser identifications can also be replicated, so that the user cannot readily differentiate original and replica from one another;
   the destruction or damage of surface properties;
   high costs for the analysis and evaluation of the structures generated using lasers.

It is therefore the object of the present invention to overcome the above-mentioned disadvantages and to propose a method for forgery-proof product identification, which may also be applied to technically functional surfaces in such a way that the desired surface properties of the affected surface are maintained.

This object is achieved by the feature combination according to patent claim 1 and also patent claims 5 and 11.

A basic concept of the present invention is to introduce an identification structure visually recognizable by a human with the naked eye for identification as an original part into a surface, without damaging the function of the surface, but simultaneously embedding the identification structure in a coded structure which is not perceptible and decodable by the observer, namely a coding in the identification structure.

For this purpose, it is proposed according to the invention that a laser method, preferably a laser interference method be provided in order to introduce a specific two-dimensional or three-dimensional pattern into the surface of the component to be identified only in such a depth imprint that a specific pattern is visually recognizable because of the incident light or also in dependence on the incident light and the light diffraction and light reflection generated by the depth structure. Thus, for example, the company name, lettering, and/or a logo in a specific representation or font can be introduced as a pattern in minimal depth, possibly with different depth structures in diverse regions of the pattern into the surface of a component. Since furthermore according to the invention the pattern is overlaid with a coding, which is not recognizable by the observer, however. If a replicator of said products were now also to attempt to introduce the recognizable pattern into the surface using a laser method, one could thus however recognize by means of a suitable decoding device that no coding is implemented in the pattern.

It is therefore provided according to the invention that during the introduction of the pattern into the surface, the coding is performed according to a specific algorithm, which can especially not be static but rather dynamically variable, so that, for example, a timestamp in the algorithm is also incorporated into the coding, so that each component is individually coded. The decoding device then has to be designed accordingly, to both recognize and also decode the coding generated using the employed algorithm.

According to the invention, for this purpose a device is provided for forming a two-dimensional or three-dimensional microstructured identification structure in a defined surface region in a surface of a component or product comprising a laser device for generating at least one specific laser beam, preferably a pulsed laser beam, a control device for the variable control and setting of the laser beam or beams, hardware and software for generating control commands for the control device from at least input and/or stored pattern data of a certain two-dimensional or three-dimensional pattern, and coding device for controlling the laser beams in such a way that a two-dimensional or three-dimensional microstructured identification structure can accordingly be formed in the defined surface region, which represents a superposition of the two-dimensional or three-dimensional pattern with the coding data.

It can be provided according to the invention that the microstructured identification structure of the pattern is composed of structured pixels of defined pixel size, which, in addition to the resolution of the pixel, also obtain an individual laser depth, which represents a depth coding, due to the generated laser depth of the respective pixel. In addition to the individual pixel-related coding, furthermore another, for example, segment-related depth coding can also be performed, in which different microstructures i.e., microstructures deviating from one another as intended, are generated in defined partial segments of the microstructured identification structure.

In the present invention, a laser beam is preferably split into two or more laser beams via an optical device and subsequently superimposed again on the workpiece surface. A periodic modulation of the laser intensity thus occurs, which enables the structuring of the component surfaces. Furthermore, by means of a specific location-dependent and time-dependent modulation or change of the laser intensity (according to a specific algorithm), the structure can be provided with a corresponding coding.

Surface scans of 0.36 m$^2$/minute on metallic substrate can be implemented using a design optimized for processing speed. Line and point structures having periods between 5 µm and 22 µm are possible.

Different laser sources can be provided according to the invention, and also different CNC axial systems can be used. Therefore, even demanding high-resolution structures<300 nm are achievable.

It is furthermore provided according to the invention that the coding data for coding a pattern to be generated on the surface of a component are stored in software of the device as an algorithm. In principle, it can be provided that arbitrary suitable control means are provided to influence the laser intensity at the point of incidence on the surface. For this purpose, optical, interconnected variable filters can also be used, which take influence on the laser intensity in either a time-controlled or intensity-controlled manner. Alternatively, pulse methods are also conceivable, which are implemented by control technology on the laser, in which in the simplest case the pulse duration correlates with the coding to be generated.

Furthermore, an input device can be provided, to input component-specific data (such as properties, material, surface condition, etc.) of the component to be provided with the identification structure. The control code stored to achieve the microstructured identification structure can be adapted or modified accordingly in this way.

A further aspect of the present invention relates to a decoding device comprising an optical detection unit for reading the coding from at least one two-dimensional or three-dimensional microstructured identification structure generated using the device in a defined surface region in a surface of a component. Using a pattern, in which the pattern in the microstructured identification structure is introduced into the surface in a form which is visually readable by a human with the naked eye without the use of a technical apparatus and/or is optically perceptible is preferably provided, while the coding contained in the microstructured identification structure can be registered only by a suitably configured decoding device, since the coding represents an encrypted, non-recognizable item of information for an observer. For this purpose, the decoding device has to contain an analysis unit in order to decode the coding generated according to a defined algorithm, which is only to be possible according to the invention if the decoding device is adapted to reading the employed algorithm or algorithms.

A further aspect of the present invention relates to a method for forming a forgery-proof identification on a surface of a component or product using an above-described device, having the following steps:

a) irradiating a surface of a component or product in a defined surface region using at least one, preferably multiple laser beams of the laser device;

b) adapting the laser beam, in particular the laser intensity and laser power, in dependence on the region of incidence ($\Delta x$, $\Delta y$) of the laser beam or laser beams on the surface segment by means of a control unit in accordance with a defined control algorithm for generating a respective specific laser beam and/or a defined laser intensity in the defined region of incidence ($\Delta x$, $\Delta y$) of the surface region; and c) generating a preferably three-dimensional microstructured identification structure in the defined surface region to form a (forgery-proof) identification in such a manner that the microstructured surface represents a superposition of a non-coded structure with a coding.

According to the invention, it is furthermore provided in the method that the control algorithm for controlling, adapting, and/or modifying the laser beam is generated at least from the pattern data of a pattern to be generated and the coding data of a desired coding. For example, lettering or a logo readable by an observer can be used as the pattern.

It is furthermore provided that the structuring depth in the method according to the invention is in the range from 300 nm to 10 µm. To implement such a minimally deep structure, for example, a multibeam laser interference technology is used, in which a frequency-multiplied Nd:YAG laser having a wavelength of 355 nm, a pulse energy of 15 mJ, and a pulse length of 38 ns is used at a repetition rate of 15 kHz as the beam source, wherein the polarization of the collimated laser beam is rotated with the aid of a half-wave plate, so that the laser beam is polarized perpendicularly to the plane of incidence. Furthermore, a beam splitter is provided for splitting the laser beam into two or more laser beams.

With the aid of an axial manipulator and a three-axis displacement assembly, a rotation table, and two additional goniometers, which are arranged orthogonally in relation to one another, the component may be aligned exactly in relation to the laser beams, on the one hand, and is thus also displaceable in at least two axes to generate a planar structuring.

In one advantageous embodiment of the invention, it is provided that furthermore data correlating with the specific function of the surface, which can preferably be input via an input unit, are incorporated into the control algorithm for controlling and adapting the laser beam.

It is furthermore preferably provided that the maximum depth of the two-dimensional or three-dimensional microstructured identification structure generated in the method in the defined surface region, measured in relation to the region of the surface surrounding the surface region, is in a range from 300 nm to 300 µm, preferably from 750 nm to 10 µm. It is furthermore advantageous if the height differences within the identification structure which were generated by the coding in relation to the uncoded pattern are in the range from 500 nm to 10 µm, preferably in a range between 750 nm and 2.5 µm.

A further aspect of the present invention relates to a component having a functional surface (preferably a sealing surface), which has a two-dimensional or three-dimensional microstructured identification structure in a surface region of this surface.

It is furthermore advantageous if the microstructured identification structure has a superposition of a two-dimensional or three-dimensional pattern with a coding which can be registered only by means of a suitable decoding device.

Therefore, a component, preferably a piston rod for a gas pressure spring and also a gas pressure spring having a piston rod is proposed according to the invention, in which a microstructured identification structure is applied to the cylindrical sealing surface of the piston rod.

Laser interference patterns are preferably recognizable within the structure by colored shadings, which were introduced during the method.

Other advantageous refinements of the invention are characterized in the dependent claims and/or are described in greater detail hereafter together with the description of the preferred embodiment of the invention on the basis of the figures.

The invention will be explained in greater detail hereafter on the basis of exemplary embodiments, wherein identical reference signs indicate identical functional and/or structural features.

Figure 1:
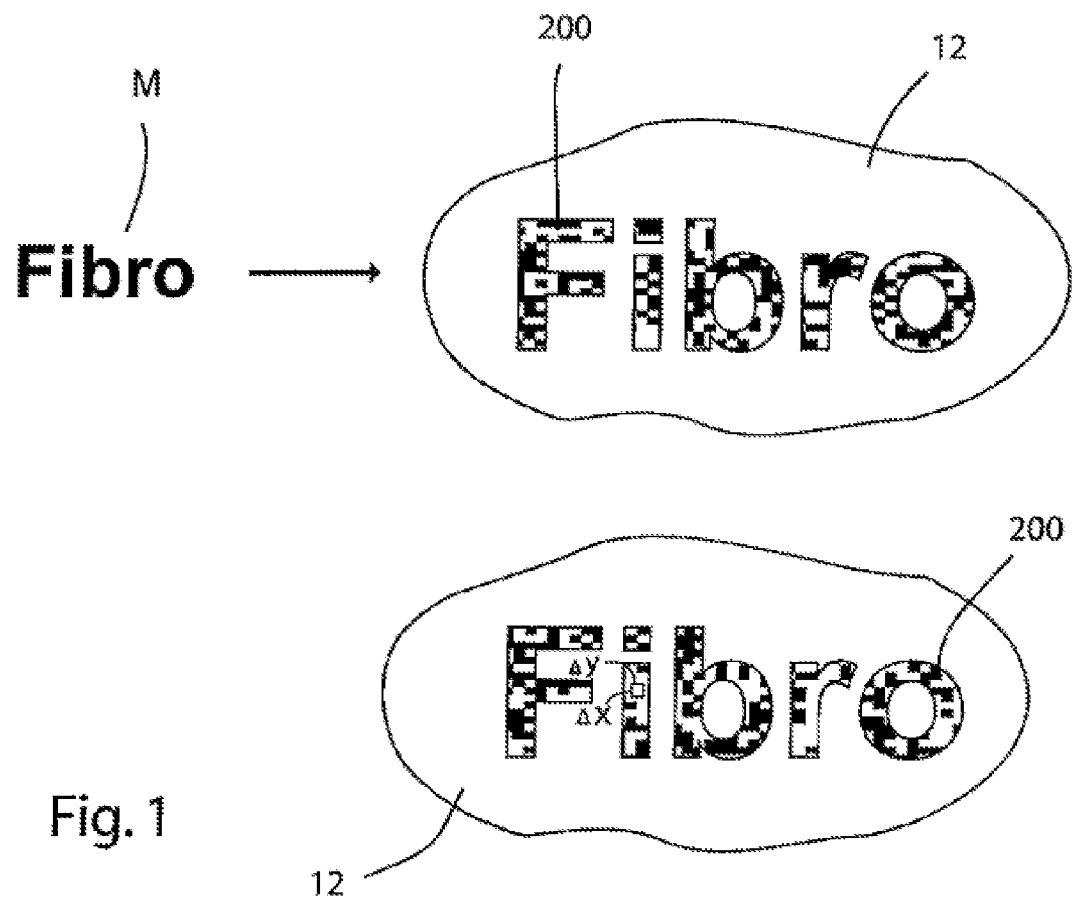
FIG. 1 shows two different coded microstructured identification structures of a pattern in a top view.
Figure 2:
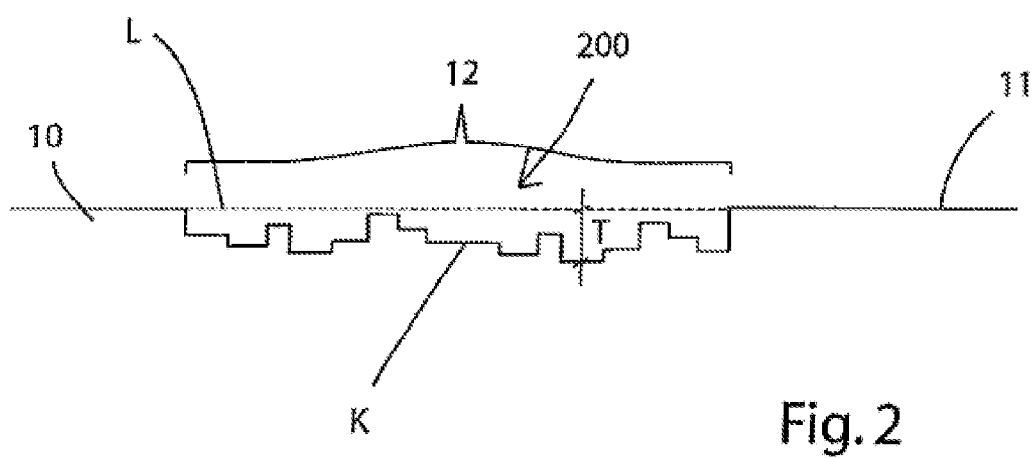
FIG. 2 shows a microstructured identification structure in a sectional view.

In FIG. 1, two different coded microstructured identification structures 200 of a pattern M are shown in a top view and, underneath this in FIG. 2, an exemplary microstructured identification structure 200 is shown in a sectional view in a component 10 having a surface 11 in a surface region 12.

The dashed line L represents the surface in the state before the irradiation using laser beams 20'. The pattern M shown in FIG. 1 was overlaid by means of a depth coding K, whereby a specific coded depth profile results. The pattern M was decomposed in this exemplary embodiment into a plurality of segments in a grid along a x axis and y axis and a coding depth T was assigned to each segment according to a predefined coding algorithm. A respective region of incidence Δx, Δy in the projected plane of the surface 11 is associated with the corresponding segment on the surface of the component to be identified in a surface region 12. The laser intensity is adapted in this region of incidence Δx, Δy in accordance with the coding information supplied by software, so that the desired structure depth T is achieved in this region of incidence Δx, Δy. The structure depth T is measured as the level difference between the dashed line L and the level of the structure in the affected segment of the microstructured identification structure 200.

Figure 3:
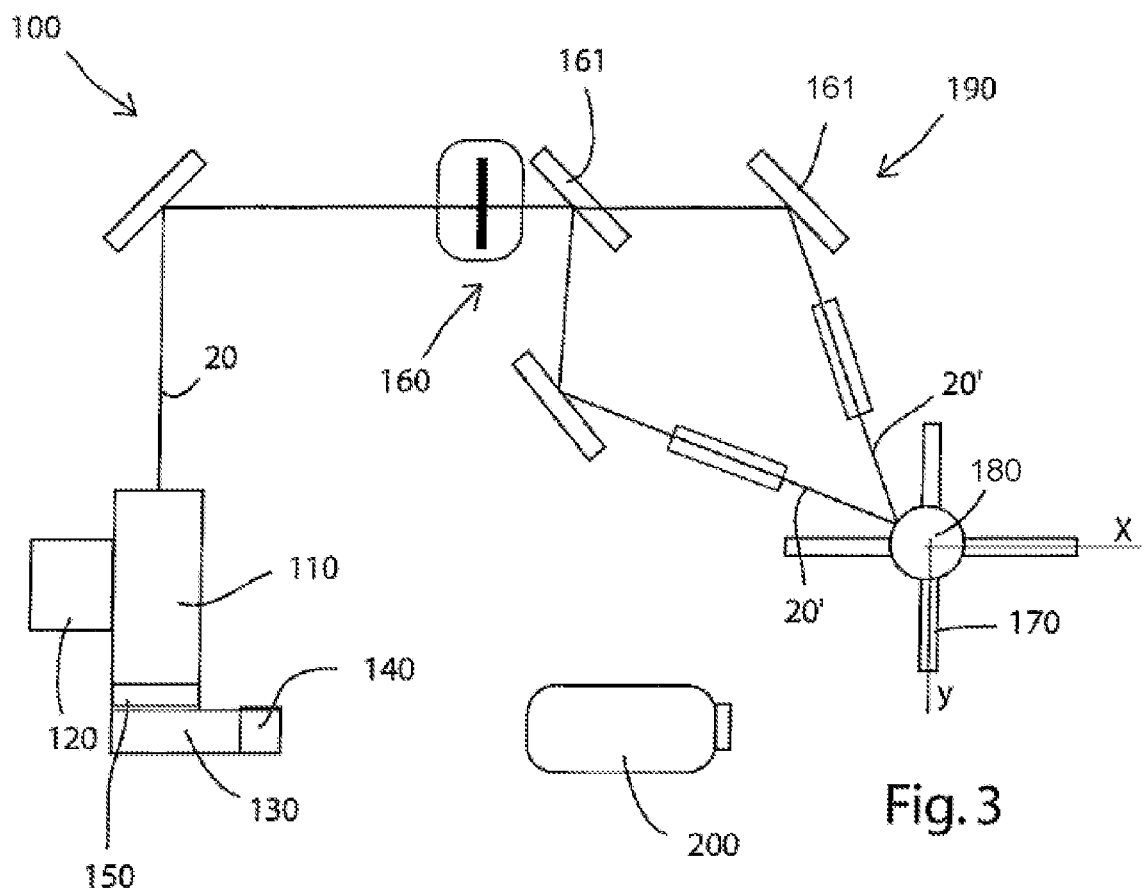
FIG. 3 shows an exemplary embodiment of a device for forming a two-dimensional or three-dimensional microstructured identification structure.

An exemplary embodiment of a device 100 for forming a two-dimensional or three-dimensional microstructured identification structure 200 is shown in FIG. 3, in order to generate a defined surface region 12 as shown in FIGS. 1 and 2 in a surface 11 of a component 10 or product. The device 100 comprises a laser device 110 for generating at least one laser beam 20, a control device 120 for the variable control and setting of the laser beam or beams 20, and hardware 130 and software 140 for generating control commands for the control device 120 from at least pattern data of a certain two-dimensional or three-dimensional pattern M, which are input and/or stored in a memory 150, and also coding data for controlling the laser beams 20.

The laser device 110 for generating the laser beams 20 is configured as multibeam laser interference technology, in which, for example, a frequency-multiplied Nd:YAG laser having a wavelength of 355 nm, a pulse energy of 13 mJ, and a pulse length of 38 ns at a repetition rate of 15 kHz is shown as the beam source.

In the exemplary embodiment shown, the polarization of the collimated laser beam takes place with the aid of a half-wave plate, in which the laser beam is rotated by 90°, so that the laser beam is polarized perpendicularly to the plane of incidence. The monitoring and variation of the polarization direction of the exceptional laser beam can be performed with the aid of conventional means (for example, a half-wave plate).

Furthermore, an optical unit 160 is provided, which comprises a diffractive optical element as a beam splitter, namely for splitting the laser beam 20 into two split laser beams 20', in the exemplary embodiment. Beam splitters which generate more than two laser beams are also conceivable.

With the aid of a manipulator 170 and a multiaxis displacement assembly 180, the component 10 may be aligned exactly in relation to the laser beams 20, on the one hand, and may thus also be displaced in at least two axes x, y to generate a planar structuring 200.

After a deflection of the laser beam by 90°, the light is conducted through a spatial filter and optionally lenses (not shown in greater detail).

The laser beam 20 may be adjusted to the desired beam diameter by displacing the lens or setting the optical unit 160. For example, the fluence (energy density per unit of area) may be varied as intended by variation of the beam diameter.

The two-beam splitter of the optical unit 160 can consist, for example, of a dielectrically coated glass substrate, which splits the laser beam into two coherent partial beams of equal intensity. The partial beams 20' having a laser angle in relation to the optical axis of the laser beam 20 are therefore incident on at least one optical element 161 of the optical unit 160, which is highly transparent to the laser radiation. This optical element is provided in such a way that the laser beams 20' are optically refracted by the optical element and are changed in the radiation direction thereof.

Furthermore, a radiation bundling unit 190 is connected downstream, in which the previously split laser beams 20' are unified again. Different interference periods may be set by way of the intentional variation of optical and geometrical variables, for example, the angle conditions. Thus, for example, the interference period may be influenced by a variable distance of the diffractive optical element (beam splitter) and the further optical element (beam unifier).

The control device 120 is accordingly used for the intended control and setting of the laser beam or beams 20 in relation to at least the interference period thereof and preferably also for the control and setting of the radiation intensity. To imprint a coding, an algorithm is used, using which, for example, a time-dependent setting and control of the interference periods and preferably also the control and setting of the radiation intensity is carried out directly or indirectly.

The component movement in relation to the laser region of incidence is carried out with the aid of the manipulator 170 and a multiaxis displacement assembly 180. While a structure corresponding to the laser intensity and/or the interference periods is formed simultaneously via the control device 120 of the laser beams on the area of incidence of the component surface, a two-dimensional or three-dimensional pattern M can be generated in the component surface with minimal structural depth by moving the laser beam controlled using an algorithm, wherein the coding imprinted by the algorithm is included overlaid in the pattern.

It is particularly advantageous if the laser beam 20 is emitted by a laser beam source 110 operated in a pulsed manner. It can furthermore be provided that the pulse frequency is controlled by the or a further control device 120 in such a way that in this way the laser energy incident per time interval on a surface element (region of incidence ($\Delta x$, $\Delta y$)) is settable and a different structure depth may be achieved in the micro-region, which is not visible to the naked eye of an observer. It is particularly advantageous if software 140 is implemented in the device, which automatically performs the control during the laser process according to retrievable pattern data and coding data.

Furthermore, a decoding device 200 not associated with the device 100 is shown in FIG. 3, which has hardware and software, and also an optical detection unit for reading the pattern and the coding.

Figure 4:
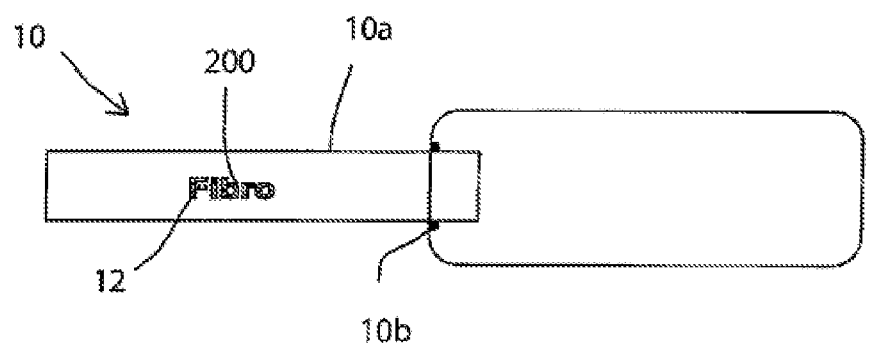
FIG. 4 shows a piston rod of a gas pressure spring.

A piston rod 10 of a gas pressure spring is shown as the component 10 in FIG. 4. The piston rod 10 has a cylindrical piston sealing surface 10*a*. The piston sealing surface 10*a* works together with a seal element 10*b*. A three-dimensional microstructured identification structure 200 is introduced into the piston sealing surface 10*a* in a surface region 12 as a superposition of a two-dimensional pattern M (as shown in FIG. 1) with a coding K.

Because of the microstructure depth generated using the method according to the invention in the above-explained depth ranges, the piston rod is provided with an identification which is unambiguously perceptible by an observer, on the one hand, and with a coding integrated in the identification which is not recognizable by a person with the naked eye, on the other hand, and has its seal function in relation to the seal element even in the surface region 12 into which the identification structure 200 is introduced, on the other hand.

The invention is not restricted in its embodiment to the preferred exemplary embodiments specified above. Rather, a number of variants are conceivable, which make use of the described solution even in fundamentally differently designed embodiments.

The invention claimed is:

1. A device for forming a two-dimensional or three-dimensional microstructured identification structure in a defined surface region in a surface of a component or product, said device comprising:
   a) a laser device for generating at least one laser beam;
   b) a control device for the variable control and setting of the laser beam or beams;
   c) hardware and software for generating control commands for the control device from at least pattern data of a certain two-dimensional or three-dimensional pattern (M) and coding data for controlling the laser beams in such a way that the two-dimensional or three-dimensional microstructured identification structure can accordingly be formed in the defined surface region, wherein the coding data is integrated within the two-dimensional or three-dimensional pattern (M) in a manner which is imperceptible to the human eye.

2. The device as claimed in claim 1, wherein the coding data for coding a pattern (M) to be generated on the surface of a component is stored in software of the device as an algorithm.

3. The device as claimed in claim 1, wherein furthermore an input device is provided, to input component-specific data of the component to be provided with the identification structure.

4. A decoding device comprising an optical detection unit for reading the coding from a two-dimensional or three-dimensional microstructured identification structure generated using the device according to claim 1, in a defined surface region in a surface of a component.

5. The device of claim 1, wherein the generated maximum depth of the two-dimensional or three-dimensional microstructured identification structure in the defined surface region measured in relation to the region of the surface surrounding the surface region is in a range from 300 nm to 300 µm.

6. The device of claim 1, wherein the height differences within the identification structure, which were generated by the coding in relation to the uncoded pattern (M), are in the range from 500 nm to 10 µm.

7. A method for forming a forgery-proof identification on a surface of a component or product using a device as claimed in claim 1, comprising:
   a. irradiating a surface of a component or product in a defined surface region using at least one laser beam of the laser device;
   b. adapting the laser beam in dependence on the region of incidence ($\Delta x$, $\Delta y$) of the laser beam or beams by means of a control unit in accordance with a defined control algorithm to generate a respective specific laser beam in the defined region of incidence ($\Delta x$, $\Delta y$) of the surface region; and
   c. generating a three-dimensional microstructured identification structure in the defined surface region to form an identification in such a way that the microstructured surface integrates a non-coded structure with a coding wherein said coding is not perceptible to the human eye.

8. The method as claimed in claim 7, wherein the control algorithm for controlling and adapting the laser beam is generated at least from the pattern data of a pattern (M) to be generated and the coding data of a desired coding.

9. The method as claimed in claim 7, wherein furthermore data correlating with the specific function of the surface, which can preferably be input via an input unit, are incorporated into the control algorithm for controlling and adapting the laser beam.

10. The method as claimed in claim 7, wherein the generated maximum depth of the two-dimensional or three-dimensional microstructured identification structure in the defined surface region measured in relation to the region of the surface surrounding the surface region is in a range from 300 nm to 300 µm.

11. The method as claimed in claim 10, wherein the generated maximum depth of the two-dimensional or three-dimensional microstructured identification structure in the defined surface region measured in relation to the region of the surface surrounding the surface region is in a range from 750 nm to 10 µm.

12. The method as claimed in claim 7, wherein the height differences within the identification structure, which were generated by the coding in relation to the uncoded pattern (M), are in the range from 500 nm to 10 µm.

13. The method as claimed in claim 12, wherein the height differences within the identification structure, which were generated by the coding in relation to the uncoded pattern (M), are in the range from 750 nm to 2.5 µm.

14. The method as claimed in claim 7, wherein the pattern (M) in the microstructured identification structure is introduced into the surface in a form which is visually readable by a human with the naked eye without the use of a technical device and/or is optically perceptible, while the coding contained in the microstructured identification structure can be registered only by a suitably configured decoding device.

15. A component, which has a two-dimensional or three-dimensional microstructured identification structure, which has a superposition of a two-dimensional or three- dimensional pattern (M) with a coding which can be registered only by means of a suitable decoding device, in a surface region of a surface of the component wherein the microstructured identification structure is produced using a method as claimed in claim 7, wherein laser interference patterns which were introduced during the method are recognizable within the structure.

* * * * *